United States Patent [19]

Tassicker

[11] Patent Number: 4,969,937
[45] Date of Patent: Nov. 13, 1990

[54] VERTICALLY TIERED PARTICLE FILTERING APPARATUS

[75] Inventor: Owen J. Tassicker, Cupertino, Calif.

[73] Assignee: Electric Power Research Institute, Palo Alto, Calif.

[21] Appl. No.: 358,869

[22] Filed: May 30, 1989

[51] Int. Cl.$^5$ ............................................. B01D 46/04
[52] U.S. Cl. ....................................... 55/302; 55/508; 55/523
[58] Field of Search ................ 55/267, 300, 302, 337, 55/484, 508, 523

[56] References Cited

U.S. PATENT DOCUMENTS

| | | |
|---|---|---|
| 655,841 | 8/1900 | watson . |
| 1,000,405 | 8/1911 | Healy . |
| 2,317,449 | 4/1943 | Flock . |
| 2,374,976 | 5/1945 | Briggs . |
| 2,523,793 | 9/1950 | Vance . |
| 3,491,518 | 1/1970 | Williams . |
| 3,798,882 | 3/1974 | Kalen ........................ 55/302 |
| 3,986,960 | 10/1976 | Wire et al. . |
| 4,226,723 | 10/1980 | Purchas . |
| 4,227,898 | 10/1980 | Kamekawa et al. ............... 55/337 X |
| 4,264,345 | 9/1981 | Miller . |
| 4,283,282 | 8/1981 | Sanit-Dizier et al. . |
| 4,289,630 | 4/1981 | Schmidt, Jr. et al. . |
| 4,307,773 | 12/1981 | Smith ....................... 55/267 X |
| 4,318,721 | 3/1982 | Barr ............................ 55/337 |
| 4,525,184 | 6/1985 | Tassicker . |
| 4,735,638 | 4/1988 | Ciliberti et al. ............. 55/302 |
| 4,738,696 | 4/1988 | Staffeld ................. 55/302 X |

FOREIGN PATENT DOCUMENTS 0578549 6/1959 Canada .

*Primary Examiner*—Charles Hart
*Attorney, Agent, or Firm*—Flehr, Hohbach, Test, Albritton & Herbert

[57] ABSTRACT

An apparatus especially suitable for filtering out a particulate material from a carrier fluid such as flue gases, as disclosed herein. This assembly utilizes a main vessel defining an interior compartment having an inlet and separate outlet. A number of filter assemblies are disposed within the vessel compartment and supported therein in spaced relationship with one another and with the vessel itself by means of a tubular member which also serves as a discharge pipe between the filter assemblies and the vessel's outlet. The main vessel is designed to act as an elementary cyclone so that filtering is carried out by both the filter assemblies and cyclonic action. Also, such filters are periodically cleaned by an arrangement that provided preheated reverse pressure pulses.

10 Claims, 3 Drawing Sheets

VERTICALLY TIERED PARTICLE FILTERING APPARATUS

The present invention relates generally to a filtering apparatus and more particularly to an improvement in the vertically tiered particle filtering apparatus disclosed in applicant's own U.S. Pat. No. 4,525,184 (hereinafter referred to as the Tassicker Patent), which patent is incorporated herein by reference.

The particle filtering apparatus disclosed in the Tassicker patent recited immediately above utilizes a main containment vessel defining an interior compartment having an inlet through which particle laden flue gases (or other such carrier fluid being filtered) can pass in order to enter the compartment. The vessel also includes a separate outlet through which the carrier fluid, once filtered, can pass in order to leave the compartment. A plurality of filter assemblies are disposed in the vessel compartment and are supported in vertically spaced apart relationship with one another and with the containment vessel itself by means of a single support tube or pipe also disposed within the vessel compartment. This tube which extends in a vertical direction serves as the sole means for supporting the filter assemblies, and, at the same time, cooperates with the filter assemblies and the vessels outlet in order to serve as a discharge pipe for directing the filter fluid out of the vessel through its outlet.

Still referring to the apparatus disclosed in the Tassicker patent, each of the filter assemblies disclosed there includes a plurality of readily providable filter tubes supported in horizontally spaced, vertically depending positions by means of an uppermost support plate (or tube sheet) having its own through hole and suitable means for supporting the uppermost ends of the filter tubes. With the exception of the uppermost filter assembly, each of the assemblies includes an uppermost hood or shed cooperating with this support plate for defining a common chamber which circumscribes a vertical section of the support tube within the vessel. The support tube includes openings into each of these chambers. Having generally described the particle filtering apparatus in the Tassicker patent from a structural standpoint, attention is now directed to the way in which it functions to filter out particulate material from flue gases produced by combustion or other such processes. Particle laden gas enters the vessel from its inlet. The pressure of the incoming gases is sufficiently high to cause it to pass through the various filter tubes forming part of the filter assemblies in order to escape from the interior of the vessel. The particle laden gas is drawn through the tubes (leaving the particles behind) and into the various chambers above the tubes and then into the support pipe where it eventually passes out of the vessel. The filter tubes are periodically cleaned by means of reverse air pressure pulses which are directed into the filter tubes from their top ends by means of a specifically designed assembly described in the patent. For the present purposes, it suffices to say that this arrangement includes pulse tubes entering the vessel on one side thereof.

While the vertically tiered particle filtering apparatus disclosed and claimed in the Tassicker Patent functions in the manner intended, the filtering apparatus disclosed herein includes a number of improved features. One such feature relates to the vessel itself which is designed to act as an elementary cyclone. As a result, as the particle laden fluid enters the vessel it is caused to move along a cyclonic (spiral) path before passing through the filter tubes. As a result, much of the particulate material is filtered out before it ever reaches the filter tubes. This, in turn, reduces the amount of particulate material which accumulates on the filter tubes themselves.

A second improved feature of the apparatus disclosed herein resides in the utilization of a specifically designed arrangement for applying reverse pressure pulses to the filter tubes for cleansing them of accumulated particulate material. As stated above, in the Tassicker patent this arrangement includes pulse tubes which enter the vessel from its exterior side wall, pass through the dusty gas region and then pass through the hood, to which they are rigidly connected, and thence into the clean gas plenum, where the cleaning pulses are distributed to individual filter elements. Thus in this prior arrangement, the pulse tubes, being rigidly mechanically fixed at two points in the apparatus, may incur severe mechanical strains due to transient thermal expansion. In the present apparatus, the pulse tubes are rigidly connected at one point only where they enter the pressure vessel, since at the nozzle end, they only enter the venturi space without being mechanically connected to the venturi. The single connection avoids any tendency for mechanical buckling due to differential thermal expansion.

A third improved feature is now that the pulse tubes may be readily maintained. In the Tassicker patent, the pulse tubes, which are known to be a critical component, are relatively inaccessible, being wholly contained in the dusty gas region. In the present embodiment, the pulse tubes may be removed as a single assembly for inspection or replacement.

A fourth improved feature is that a single pulse tube now reverse pressurizes the whole cavity inside a single hood and at the same time a large number of filter elements located underneath it. As a result, the number of both pulse tubes required and their attendant valves is reduced. The overall system is thus simplified.

A fifth improved feature deals with preheating the pulses of cleansing gas. In the Tassicker patent, when pressure pulses, which are relatively cold, pass through the pulse tubes and into the filter elements, thermal shock may occur, which could damage both components. In the present apparatus, the pulses are preheated in a manner to be described, so that such mechanical damage due to cyclic thermal fatigue is alleviated.

In accordance with a sixth improved feature of the present arrangement, each of the vertically depending filter tubes is connected at its top end to the underside of its support plate so that it can be easily removed.

The various features described above and other features of the present invention will be described in more detail hereinafter, in conjunction with the drawings, wherein.

Figure 1:
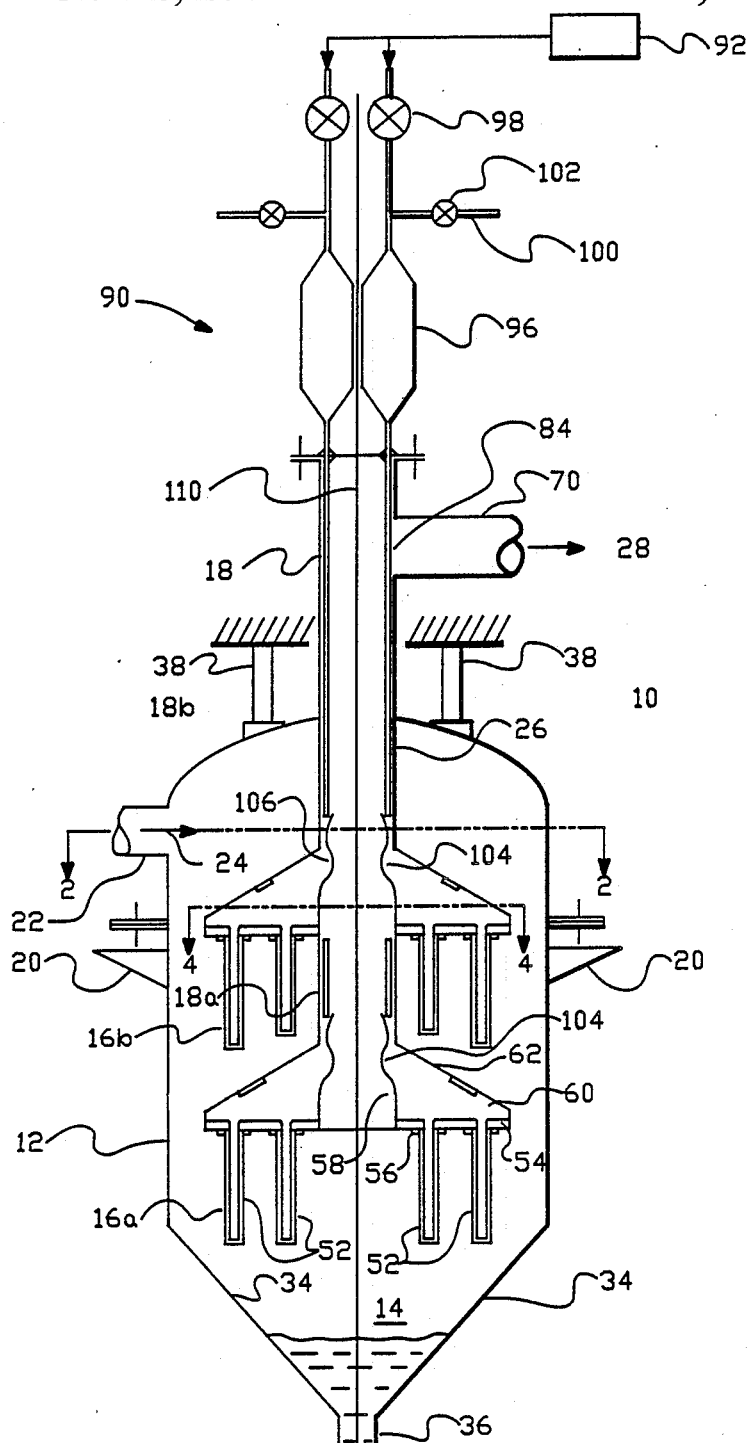
FIG. 1 is an elevational view in section, illustrating the filtering apparatus in accordance with the present invention.

Turning now to the drawings, wherein like components are designated by like reference numerals throughout the various figures, an apparatus for filtering out particulate material of a predetermined minimum size from flue gases produced by combustion or other such processes is illustrated in FIG. 1 and is generally designated by the reference numeral 10. This apparatus is comprised of a main containment vessel 12 defining an interior compartment 14, two filter assemblies 16A and 16B located within compartment 14, and a single support pipe 18 for supporting the filter assemblies 16 in a tiered fashion, that is, in vertically spaced relationship to one another. For the reasons set forth in Tassicker Pat. No. 4,525,184, support pipe 18 serves as the sole or substantially the sole means for supporting the filter assemblies, and, at the same time, serves as a discharge pipe for filtered flue gases.

As illustrated in FIG. 1, vessel 12 is supported in a vertically extending position by suitable support means generally indicated at 20 and includes an inlet 22 through which particulate laden flue gases, generally indicated at the 24, pass in order to enter compartment 14. The vessel provides a separate outlet 26 through which the gases, generally indicated at 28, pass in order to leave the compartment once they have been cleaned of particulate matter of a predetermined minimum size by means of filtering assemblies 16. The inlet 22 is shown in the vertical sidewall 30 forming part of vessel 12 near the top end of the latter and laterally offset with respect to support pipe 18 (see FIG. 2) in the manner and for the reasons to be discussed below. The outlet 26 is shown at the very top end of the vessel, actually at the peak of its dome 32 which is removably attached to the top end of side wall 30 in a sealed manner by suitable means as generally indicated at 33. Inlet 22 and outlet 26 are the only openings into and out of compartment 14, except for a lowermost outlet 36 which forms the bottom end of a dust hopper 34 and which also serves as the bottom end of the vessel. While not shown, suitable means are provided for opening and closing outlet 36 in a sealed manner. The overall vessel itself may be supported to a fixed support member by any suitable means, for example those means generally indicated at 38.

Turning now to filter assemblies 16, attention is first directed to the bottom filter assembly 16A. As illustrated in FIG. 1, that assembly includes a plurality of readily providable filter tubes 52 which may be of similar lengths as shown or may be of varying lengths. The filter tubes are supported in horizontally spaced, vertically depending positions by means of an uppermost support plate (or tube sheet) 54. The support plate includes its own through holes 56 and suitable means to be discussed hereinafter for supporting uppermost ends of the filter tubes adjacent the through holes, in accordance with the present invention. The bottom ends of the filter tubes 52 are closed and the top ends open into a common chamber 58 defined by a hood or shed 60 in combination with support plate 54. More specifically, hood 60 which forms part of filter assembly 16A has a bottom end which is fixedly connected to and closed by support plate 54. At the same time, the hood extends up from the support plate around and is connected to the bottom end of lowermost end section 18A of support pipe 18. In the embodiment illustrated and in a preferred embodiment, hood or shed 60 includes an outwardly and downwardly tapering top surface 62 which better serves to shed dust accumulating thereon, especially dust from filter assembly 16B directly above it, since this latter assembly is periodically cleaned in place, as will be discussed hereinafter.

Having described filter assembly 16A, attention is now directed to filter assembly 16B which is located directly above the assembly 16A. Both assemblies may be identical, except that assembly 16B extends around an upper section of support pipe 18, rather than being supported at its lowermost end. In fact, as illustrated in FIG. 1, support pipe 18 is actually constructed of two sections, section 18A which is disposed between the two filter assemblies and section 18B disposed above assembly 16B. Also, as can be seen, the filter tubes forming part of the assembly 16B are not of equal length, whereas they are in the assembly 16A.

Overall apparatus 10, as described thus far, may be identical or substantially identical to the apparatus disclosed in corresponding apparatus 10 illustrated in Tassicker U.S. Pat. No. 4,525,184, except for the specific way in which the filter tubes 52 are supported to their respective plates and a particular location of inlet 22. With this in mind, attention is now directed to the way in which arrangement 10 functions to filter out particulate material of a predetermined minimum size from flue gases produced by combustion or other such processes. As stated above, particle laden gas enters the vessel from inlet 22. At the same time, the dust hopper is maintained in a closed position. The pressure of the incoming gas is sufficiently high to cause it to pass through the various filters 52 in order to escape compartment 14. In this regard, it should be noted that both of the filter assemblies 16A and 16B remain out of engagement with the containment vessel, except of course through support pipe 18. This is possible because the pipe itself provides the sole means of support for the filter assemblies, as discussed in the Tassicker patent. As a result, incoming flue gases may flow unobstructed around the filter tubes forming both assemblies 16 in a vertically downward direction. The particle laden gas surrounding these tubes is drawn into the latter because of a differential pressure between compartment 14 and the interior of the tubes which may be maintained at any suitable pressure through support pipe 18. As the particle laden gas passes through the various filter tubes it is filtered and thereafter passes through the various hood chambers 58 and into pipe 18 for ultimate passage out of vessel 12. In this regard, it should be noted that pipe 18 itself includes an outlet pipe 70 extending just below the uppermost end of the pipe to one side thereof. At the same time, the top end of pipe 18 is closed. The reason for this particular arrangement will be described hereinafter.

Figure 2:
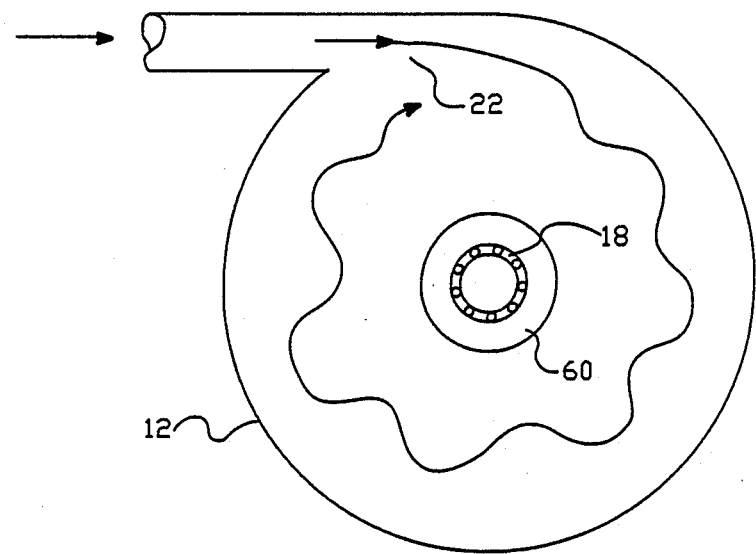
FIG. 2 is a vertical sectional view taken generally along lines 2—2 in FIG. 1.

Referring to FIG. 2 in conjunction with FIG. 1, it should be noted that inlet 22 is located vertically above upper filter assembly 16B (FIG. 1) and laterally or radially to one side of filter assembly and support pipe 18 (FIG. 2). As a result, as particulate laden flue gas enters compartment 14 of vessel 12 through inlet 22, it is caused to move around the filter assemblies and down the vessel compartment along a cyclonic (spiral) path around the filter assemblies before it ever passes into and through filter tubes 52. In this way, the vessel itself acts as an elementary cyclone and some of the particulate material within the gas is filtered out by means of the centrifical forces acting on gas as it spirals down compartment 14 along the internal surface of sidewall 12. Thus, the gas is less particle laden when it reaches filter tubes 52 then it would otherwise be if there were no cyclonic action. This, in turn, means that less particulate material accumulates on the filter tubes and the latter can be cleaned less often. This combination of cyclonic action and filter tubes to filter out particulate material of the flue gases is to be contrasted with the apparatus disclosed in the Tassicker patent, which apparatus relies only on the filter tubes themselves.

Figure 5:
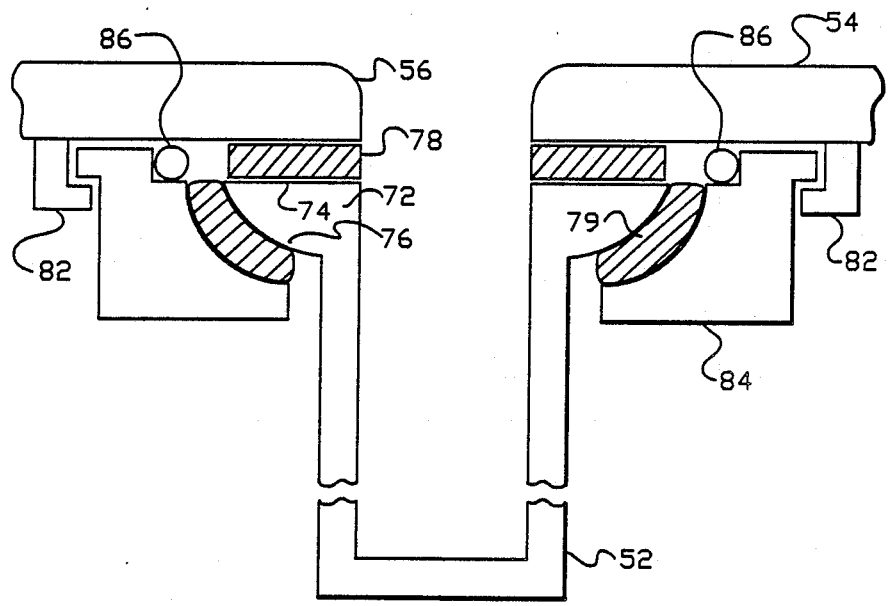
FIG. 5 is a diagrammatic illustration of one of many filter tube support devices forming part of the arrangement of FIG. 1.

Referring to FIG. 5, attention is directed to the way in which each filter tube 52 is mounted to its associated tube sheet 54. As illustrated in this latter figure, the uppermost end of each filter tube includes an enlarged laterally outwardly circumscribing flange 72 having an uppermost flat surface 74 and a rounded bottom circumferrential surface 76. The tube is positioned vertically under a cooperating opening 56 in tube sheet 54 so that the uppermost circumferential surface 74 of flange 72 confronts a corresponding section of the underside of sheet 54 surrounding the through hole. A fibrous flat, washer-shaped gasket 78 is positioned between the tube sheet and surface 74, as illustrated, and serves as both a seal and means for compensating for differences in thermal expansion between the tube and the tube sheet.

Still referring to FIG. 5, the filter tube shown there is supported in the position illustrated by means of an attachment assembly 80. This assembly includes a bayonet connector 82 fixedly mounted to and extending down from tube sheet 54 around cooperating hole 56. The assembly also includes an attachment device 84 which extends around flange 72 and fits within connector 82 in a bayonet type manner. Note specifically that a second fibrous gasket 79 is also located between the flange 72 and attachment device 84 around the upper end of the tube. This latter device also includes an annular seal ring 86.

Each of the filter tubes 52 includes a corresponding one of the attachment assemblies 80 described above. In this way, each of the filter tubes can be mounted to its tube sheet without having to get into its chamber 58. This is to be contrasted with, for example, apparatus 10 in the Tassicker patent wherein each of the filter tubes extend into its cooperating opening and its associates tube sheet. In the previous Tassicker patent, the connection feature by which the filter elements were attached to the Tube Sheet was not described in particular. The present description provides a preferred specific approach. In the traditional method of connecting filter elements to a tube sheet, this is done from the top downwards, in such a way that filter elements are lowered down into a prepared hole together with suitable gaskets. In the Tassicker patent, it would be awkward, or even impossible to maneuver the filter elements through the space 58 and into proper position on the top of the tube sheet. It would be difficult to remove them for inspection or replacement.

The advantage of the present mounting arrangement depicted in FIG. 5, is in the ease of maintenance and inspection. First the dome section 32 is separated from the main containment vessel 12 by disconnecting the flange 33. Vessel 12 is lowered by means of supports 20, so exposing the assemblies 16. Then by means of the quick release couplings depicted in FIG. 5, elements may be easily removed for inspection or replacement.

Figure 3:
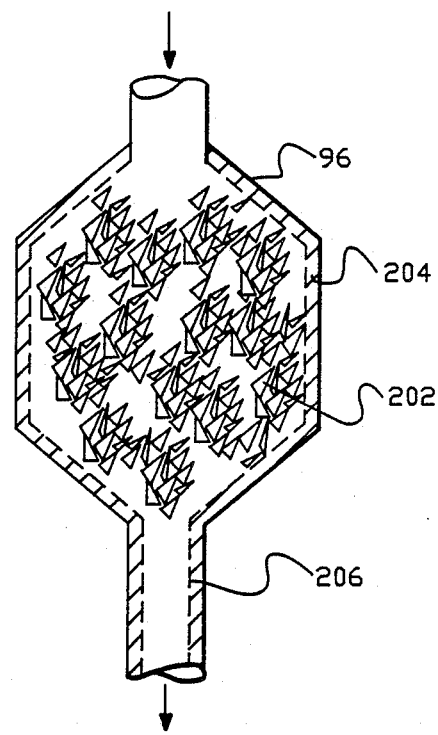
FIG. 3 is a diagrammatic illustration of a heat recuperator forming part of the apparatus of FIG. 1.

In addition to the components thus far described, overall filtering arrangement 10 disclosed herein is provided with an assembly for periodically cleaning the filter tubes 52. This assembly which is generally indicated by the reference numeral 90 includes a source of pressurized air, for example, an gas pump, which is diagrammatically illustrated at 72. The assembly also includes a plurality of pulse pipes 94 extending downward into and through outlet pipe 18 from the top end thereof. As illustrated in FIG. 1, a heat recuperator 96, to be described in more detail hereinafter in conjunction with FIG. 3, is disposed in line with each of the pulse pipes 94, along with a pulse valve 98. In addition, for reasons to become apparent below, each pulse pipe includes the bleed off line 100 and associated valve 102.

Still referring to FIG. 1, it should be noted that each of the filter assemblies 16 includes a convergent nozzle arrangement 104 which defines an annular venturi 106 located at the uppermost end of each chamber 58 at the entry of each outlet pipe section 18A and 18B. It should also be noted that the lowermost end of each of the pulse pipes is disposed at the uppermost end of the corresponding venturi. Thus, as seen in FIG. 1, two such pulse pipes communicate with the upper chamber 58 forming part of filter assembly 16B and two pulse pipes communicate with the lower chamber 58 forming part of the filter assembly 16A. One or more such pulse pipes can be provided with each chamber, if necessary, as will become apparent below. With regard to the recuperators, for the moment it suffices to say that each one serves as a heat storage and exchange member which allows the passage of and actually heats up a gas pressure pulse without causing an excessive pressure drop within the associated pulse tube.

Having described overall assembly 90 from a structural standpoint, attention is now directed to the way in which it functions to periodically clean filter tubes 52. It does this in generally the same manner described in the Tassicker patent, that is, by directing periodic pulses of air pressure into the filter tubes from the opened top ends of the latter, thereby "reverse pressurizing" the filter tubes and, thus, causing particulate material accumulated on their outer surfaces to be blown off. The pressure source 92 in combination with pulse valves 98 provide such pulses by periodically opening and closing the valves which may be, for example, solenoid operated.

Each pulse pipe 94 is required to withstand the bursting pressure of the pulse and should the pulse fluid itself be colder than the temperatures inside the pressure vessel, additional stresses in the pulse pipe will result due to thermal expansion. In order to alleviate such cyclic thermal mechanical stresses assembly 90 is used. Just before a given pulse, each pulse pipe is maintained in a quasi steady state (cyclic) condition. The pressure, inside and out, is uniform at system pressure, typically 10 to 20 BAR. It is also nearly uniformly at system temperature, possibly 800°C. This is also true of the heat recuperator and the pulse pipe. During a given pulse (which may be cool), each associated heat recuperator transmits heat to the pulse gas. By the time the pulse gas reaches the outlet of the recuperator, it has been heated almost to system temperature. Following the pulse (of about 1 second) and the closure of valve 98, bleed valve 102 is opened and allows a small flow of gas through the heat recuperator to escape from the pressure vessel under system pressure to ambient. This flow of gas, at system temperature, slowly reheats the recuperator. During this reheating period, which may last 1000 seconds, for example, there is an axial temperature gradient which slowly evens out before the next pulse. After several pulses and reheating, the temperature throughout the pulse system reaches a cyclic (quasi steady) condition.

Assembly 90, as described above, should be distinguished from the system utilized in the Tassicker patent. As stated above, the arrangement disclosed in this latter patent utilizes pulse pipes that extend into the vessel compartment from one side wall of the vessel. These pulse pipes are welded or otherwise fixedly connected to both the vessel sidewalls and to the hood assembly. In the case of assembly 90, it should be noted that the pulse pipes 94 extend through the outlet pipe without being fixedly connected to the latter, except that at the top closed end. Note specifically that this top end is insulated by suitable means generally indicated at 110. Thus, any tendency for the pulse tubes to buckle is avoided, since they are rigidly connected at one point.

Figure 4:
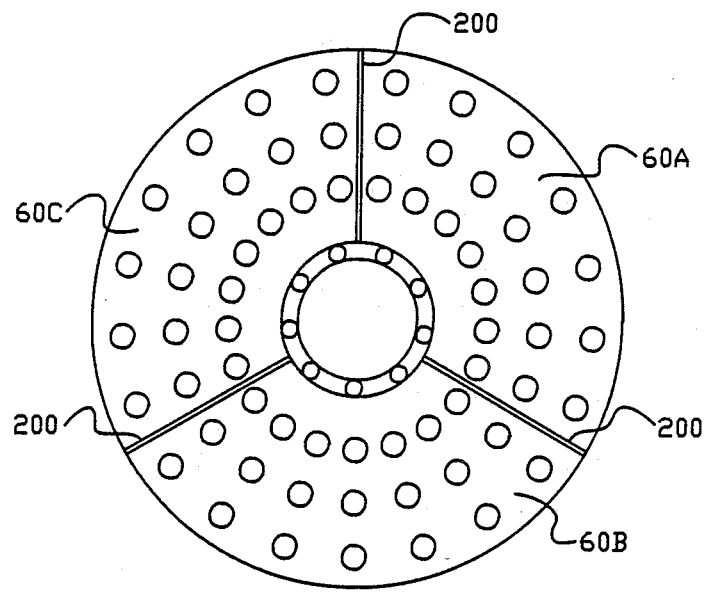
FIG. 4 is a sectional view taken generally along line 4—4 in FIG. 1.

In the discussion immediately above, it was assumed that all of the pulse pipes associated with a given filter assembly enter the common chamber 58. It may be desirable to separate the chamber into a plurality of separate and distinct subchambers by dividers, as illustrated in FIG. 4. As seen there, the chamber 58 of upper filter assembly 16B for example, is shown separated into three subchambers 60A, 60B and 60C by means of three dividers 200. While not shown in FIG. 4, it should be noted that at least one pulse pipe 94 is associated with each of these subchambers.

Turning now to FIG. 3, attention is now directed to an exemplary heat recuperator 96. The particular recuperator illustrated contains compact heat exchange elements 202 throughout its internal volume. These elements should be sufficiently porous so as not to produce a significant pressure drop across the recuperator. At the same time, they should be capable of storing heat directed into the recuperator while at the same time allowing heat to be transferred to the pressure pulses passing therethrough. An example of heat exchange elements 202 is wire mesh or a thin metal grid. The external shell of the recuperator is preferably constructed of metal internally lined with a porous thermal insulation 204, for example, alumino-silicate fibres. A perforated metal liner 206 is provided to contain the porous thermal insulation. Just before a pulse, compact heat exchange elements are heated by the bleed gas flow from the process. During a pulse, the compact heat exchanger elements are cooled as they transmit heat to the pulse gas. The insulation prevents significant cooling of the container 96. The perforated liner experiences no pressure force but it does adopt the temperature of the compact heat exchanger. The outer cylinder 96 experiences an internal bursting pressure due to the pulse, but is protected from temperature cycling as described above.

What is claimed is:

1. An apparatus especially suitable for filtering out particulate material of a predetermined minimum size from carrier fluid such as flue gases produced by combustion or other such processes, said apparatus comprising:
   (a) a main vessel defining an interior compartment and having inlet means through which a particulate laden carrier fluid can pass in order to enter said compartment and separate outlet means through which said carrier fluid, once filtered, can pass in order to leave said compartment;
   (b) means including a plurality of filter assemblies disposed within the interior compartment of said vessel radially inward of the interior wall of the vessel for filtering out particulate material of said predetermined minimum size from said carrier fluid as said fluid passes through said compartment from said inlet means to said outlet means, said means also includes said filter assemblies includes a vertically extending outlet pipe which supports said filter assemblies and which is in fluid communication with said outlet means, each of said filter assemblies including a plurality of filters and means defining a chamber in fluid communication with said filters and said outlet pipe, whereby said carrier fluid is caused to pass through said filters where it is filtered, through said chamber and through said outlet pipe as said fluid passes out of said vessel compartment through said outlet means;
   (c) said inlet means of said main vessel being located relative to the interior compartment of the vessel so as to cause said particulate laden gas to move through said compartment along a cyclonic path, whereby to aid in filtering out particulate material from said carrier fluid;
   (d) means extending into said outlet pipe from outside said vessel for applying periodic pulses of gas pressure into the chamber of each of said filter assemblies for periodically pressurizing said filters relative to the pressure within said vessel compartment, whereby to clean said filters of particulate accumulating on their outer surfaces, said means extending into said outlet pipe for applying periodic pulses including tubes extending into and through most of said outlet pipe without being fixedly connected with the outlet pipe, except at its top end, said means extending within said outlet pipe also including a source of said pressure pulses located outside said vessel and means also located outside said vessel for heating said pulses of gas pressure; and
   (e) means for holding said pressure tubes in place to the top end of said outlet pipe and means located with and directly below the top end of the outlet pipe for thermally insulating said top end.

2. An apparatus according to claim 1 wherein said means including said filter assemblies includes a vertically extending outlet pipe supporting said filter assemblies centrally within said compartment such that the outlet pipe extends coaxially with the vertical axis of the vessel, and wherein said inlet means is located above said filter assemblies and laterally to one side of said outlet pipe.

3. An apparatus according to claim 2 wherein said means including said filter assemblies includes at least two such assemblies vertically aligned relative to one another, each assembly including a plurality of vertically extending filters.

4. An apparatus according to claim 1 wherein said heating means includes a heat storage and exchange arrangement in fluid communication with said pressure tubes and means for causing a small amount of said carrier fluid within the chamber of said filter assemblies to bleed through said tubes and through said heat storage and exchange arrangement for heating the latter.

5. An apparatus according to claim 1 wherein said chamber defining means includes a horizontally extending bottom plate member having through holes equal in number to said plurality of filters, and means for mounting the uppermost ends of said filters to the underside of said plate member over said through holes.

6. An apparatus especially suitable for filtering out particulate material of a predetermined minimum size from carrier fluid such as flue gases produced by combustion or other such processes, said apparatus comprising:
(a) a main vessel defining an interior compartment and having inlet means through which a particulate laden carrier fluid can pass in order to enter said compartment and separate outlet means through which said carrier fluid, once filtered, can pass in order to leave said compartment;
(b) means including a plurality of filter assemblies disposed within the interior compartment of said vessel for filtering out particulate material of said predetermined minimum size from said carrier fluid as said fluid passes through said compartment from said inlet means to said outlet means, said means including said filter assembly including a vertically extending outlet pipe which supports said filter assemblies and which is in fluid communication with sid outlet means, each of said filter assemblies including a plurality of filters and means defining a chamber in fluid communication with said filters and said outlet pipe, whereby said carrier fluid is caused to pass through said filters where it is filtered, through said chamber and through said outlet pipe as said fluid passes out of said vessel compartment through said outlet means; and
(c) means extending into said outlet pipe from outside said vessel for applying periodic pulses of air pressure into the chamber of each of said filter assemblies for periodically pressurizing said filters relative to the pressure within said vessel compartment, whereby to clean said filters of particulate accumulating on their outer surfaces, said means extending within said outlet pipe including a source of said pressure pulses located outside said vessel and means also located outside said vessel for heating said pulses of air pressure.

7. An apparatus according to claim 6 wherein said means extending into said outlet pipe includes pulsating pressure means extending into and through most of said outlet pipe without being fixedly connected with the outlet pipe, except at its top end.

8. An apparatus according to claim 7 including means for holding said pressure tubes in place to the top end of said outlet pipe and means located with and directly below the top end of the outlet pipe for thermally insulating said top end.

9. An apparatus according to claim 6 wherein said heating means includes a heat storage and exchange arrangement in fluid communication with said pressure tubes and means for causing a small amount of said carrier fluid within the chamber of said filter assemblies to blead through said tubes and through said heat storage and exchange arrangement for heating the latter.

10. An apparatus especially suitable for filtering out particulate material of a predetermined minimum size from carrier fluid such as flue gases produced by combustion or other such processes, said apparatus comprising:
(a) a main vessel defining an interior compartment and having inlet means through which a particulate laden carrier fluid can pass in order to enter said compartment and separate outlet means through which said carrier fluid, once filtered, can pass in order to leave said compartment; and
(b) means including a plurality of filter assemblies disposed within the interior compartment of said vessel for filtering out particulate material of said predetermined minimum size from said carrier fluid as said fluid passes through said compartment from said inlet means to said outlet means, said means including said filter assembly including a vertically extending outlet pipe which supports said filter assemblies and which is in fluid communication with said outlet means, each of said filter assemblies including a plurality of filters, each having an enlarged upper end, and means defining a chamber in fluid communication with said filters and said outlet pipe, whereby said carrier fluid is caused to pass through said filters where it is filtered, through said chamber and through said outlet pipe as said fluid passes out of said vessel compartment through said outlet means, said chamber defining means including a horizontally extending bottom plate member having through holes equal in number to said plurality of filters and a bayonet connector assembly for mounting the uppermost ends of said filters to the underside of said plate member.

* * * * *